United States Patent
Chen et al.

(10) Patent No.: US 11,270,157 B2
(45) Date of Patent: Mar. 8, 2022

(54) SYSTEM AND METHOD FOR CLASSIFICATION DETERMINATION

(71) Applicant: SHANGHAI UNITED IMAGING INTELLIGENCE CO., LTD., Shanghai (CN)

(72) Inventors: Yanbo Chen, Shanghai (CN); Yaozong Gao, Shanghai (CN); Yiqiang Zhan, Shanghai (CN)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 10 days.

(21) Appl. No.: 16/728,086

(22) Filed: Dec. 27, 2019

(65) Prior Publication Data
US 2020/0210761 A1  Jul. 2, 2020

(30) Foreign Application Priority Data
Dec. 28, 2018 (CN) .......................... 201811630064.4

(51) Int. Cl.
*G06K 9/00* (2006.01)
*G06K 9/62* (2022.01)

(52) U.S. Cl.
CPC .......... *G06K 9/6228* (2013.01); *G06K 9/628* (2013.01); *G06K 9/6277* (2013.01); *G06K 2209/053* (2013.01)

(58) Field of Classification Search
CPC ............... G06K 9/6228; G06K 9/6277; G06K 2209/053
See application file for complete search history.

(56) References Cited

U.S. PATENT DOCUMENTS 8,116,574 B2 * 2/2012 Engels ................. G06K 9/6254
  382/224
10,121,243 B2 * 11/2018 Boroczky ................. G06T 7/48
(Continued)

FOREIGN PATENT DOCUMENTS

CN  103745227 A  4/2014
CN  108615237 A  10/2018
(Continued)

OTHER PUBLICATIONS

Cao Lei, "Analysis and Identification of Pulmonary Nodule Images". (Year: 2005).*
(Continued)

*Primary Examiner* — Khai M Nguyen
(74) *Attorney, Agent, or Firm* — Metis IP LLC

(57) ABSTRACT

The present disclosure provides a system and method for classification determination of a structure. The method may include obtaining image data representing a structure of a subject. The method may also include determining a plurality of candidate classifications of the structure and their respective probabilities by inputting the image data into a classification model. The classification model may include a backbone network for determining a backbone feature of the structure, a segmentation network for determining a segmentation feature of the structure, and a density classification network for determining a density feature of the structure. The method may further include determining a target classification of the structure based on at least a part of the probabilities of the plurality of candidate classifications.

15 Claims, 10 Drawing Sheets

(56) References Cited

U.S. PATENT DOCUMENTS

| 10,949,714 | B2* | 3/2021 | Gur ..................... G06K 9/4628 |
| 2002/0172403 | A1* | 11/2002 | Doi ..................... G06T 7/0012 |
| | | | 382/128 |
| 2005/0259855 | A1* | 11/2005 | Dehmeshki ............... G06T 7/11 |
| | | | 382/131 |
| 2017/0168586 | A1* | 6/2017 | Sinha ................. G06K 9/00382 |
| 2020/0175334 | A1* | 6/2020 | Zhang ................. G06K 9/6262 |

FOREIGN PATENT DOCUMENTS

| CN | 108986067 A | 12/2018 |
| CN | 108986085 A | 12/2018 |

OTHER PUBLICATIONS

Cao lei (Analysis and Identification of Pulmonary Nodule Images) (Year: 2009).*
Cao Lei, Analysis and identification of Pulmonary Nodule images, Wanfang Data, 2009, 100 pages.
The Second Office Action in Chinese Application No. 201811630064.4 dated Jun. 11, 2020, 16 pages.
The Third Office Action in Chinese Application No. 201811630064.4 dated Nov. 3, 2020, 18 pages.
Yu, Jianming et al., Advanced Course of Radiological Medicine Technology 2017, Chinese Medical Multimedia Press, 2016, 17 pages.
Lou, Yan, Introduction to Intelligent Medicine, China Railway Publishing house, 2018, 16 pages.

* cited by examiner

SYSTEM AND METHOD FOR CLASSIFICATION DETERMINATION

CROSS-REFERENCE TO RELATED APPLICATIONS

This application claims priority to Chinese Application No. 201811630064.4, filed on Dec. 28, 2018, the contents of which are hereby incorporated by reference.

TECHNICAL FIELD

The present disclosure generally relates to systems and methods for imaging, and more particularly, to systems and methods for determining a target classification of a structure in an image.

BACKGROUND

Medical imaging for diagnosis and treatment may be implemented by systems including, e.g., a X-ray imaging system, a positron emission tomography (PET) system, a magnetic resonance (MR) system, a computed tomography (CT) system, a single-photon emission computed tomography (SPECT) system, a radioisotope imaging system, etc. For instance, CT is a widely used diagnosis technique. However, image analysis by a healthcare provider, e.g., a doctor, may be time consuming, and/or introduce inconsistencies or errors caused by differences between healthcare providers. In recent years, computer-aided diagnosis (CAD) has been developed to reduce work intensities of doctors as well as improve the disgnostic accuracy. However, structures, such as pulmonary nodules and pleural nodules of small sizes, are still difficult to distinguish their classfications (e.g., malignancies). Thus, it is desirable to develop a system and method for automated determination of a target classification of a structure more accurately and efficiently.

SUMMARY

In a first aspect of the present disclosure, a system is provided. The system may include at least one storage medium including a set of instructions, and at least one processor in communication with the at least one storage medium. When executing the set of instructions, the at least one processor may be configured to direct the system to perform operations including obtaining image data representing a structure of a subject, determining a plurality of candidate classifications of the structure and their respective probabilities by inputting the image data into a classification model, wherein the classification model includes a backbone network for determining a backbone feature of the structure, a segmentation network for determining a segmentation feature of the structure, and a density classification network for determining a density feature of the structure, and determining a target classification of the structure based on the probabilities of the plurality of candidate classifications.

In some embodiments, the backbone network may include a plurality of down-sampling layers, each down-sampling layer including a convolution layer, a batch normalization layer, and a rectified linear unit layer.

In some embodiments, the determining a plurality of candidate classifications of the structure by inputting the image data into a classification model may include obtaining the backbone feature, the segmentation feature, and the density feature by inputting the image data into the backbone network, the segmentation network, and the density classification network, respectively, and determining a probability of each of the plurality of candidate classifications of the structure based on the backbone feature, the segmentation feature, and the density feature.

In some embodiments, the determining the probability of each of the plurality of classifications of the structure based on the backbone feature, the segmentation feature, and the density feature may include determining an identification feature of the image data by combining the backbone feature, the segmentation feature, and the density feature, and determining the probability of each of the plurality of candidate classifications of the structure based on the determined identification feature of the image data.

In some embodiments, the determining an identification feature of the image data by combining the backbone feature, the segmentation feature, and the density feature may include converting the backbone feature, the segmentation feature, and the density feature into a one-dimensional backbone feature vector, a one-dimensional segmentation feature vector, and a one-dimensional density feature vector, respectively, determining a one-dimensional identification feature vector by splicing the one-dimensional backbone feature vector, the one-dimensional segmentation feature vector, and the one-dimensional density feature vector, and designating the one-dimensional identification feature vector as the identification feature of the image data.

In some embodiments, the classification model may be trained according to a focal loss function, at least one weight of the focal loss function each of which corresponds to one of the plurality of candidate classifications being different from weights of the focal loss function corresponding to the remainder of the plurality of candidate classifications.

In some embodiments, the obtaining image data representing a structure of a subject may include obtaining original image data including a representation of the structure of the subject, and determining the image data by preprocessing the original image data.

In some embodiments, the determining the image data by preprocessing the original image data may include generating a resampled image by resampling the original image data according to a resampling resolution, segmenting the resampled image into image crops according to a center of the structure, and determining the image data by normalizing the image crops according to a normalizing function.

In a second aspect of the present disclosure, a system is provided. The system may include at least one storage medium including a set of instructions, and at least one processor in communication with the at least one storage medium. When executing the set of instructions, the at least one processor may be configured to direct the system to perform operations including obtaining a preliminary classification model, and generating a classification model for determining a plurality of candidate classifications of a structure of a subject represented in image data by training the preliminary classification model using a focal loss function, wherein at least one weight of the focal loss function each of which corresponds to one of the plurality of candidate classifications being different from weights of the focal loss function corresponding to the remainder of the plurality of candidate classifications.

In a third aspect of the present disclosure, a method is provided. The method may be implemented on a computing device having at least one processor and at least one computer-readable storage device. The method may include obtaining, by the computing device, image data representing a structure of a subject, determining, by the computing device, a plurality of candidate classifications of the structure and their respective probabilities by inputting the image data into a classification model, wherein the classification model includes a backbone network for determining a backbone feature of the structure, a segmentation network for determining a segmentation feature of the structure, and a density classification network for determining a density feature of the structure, and determining, by the computing device, a target classification of the structure based on the probabilities of the plurality of candidate classifications.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by another expression if they may achieve the same purpose.

Figure 2:
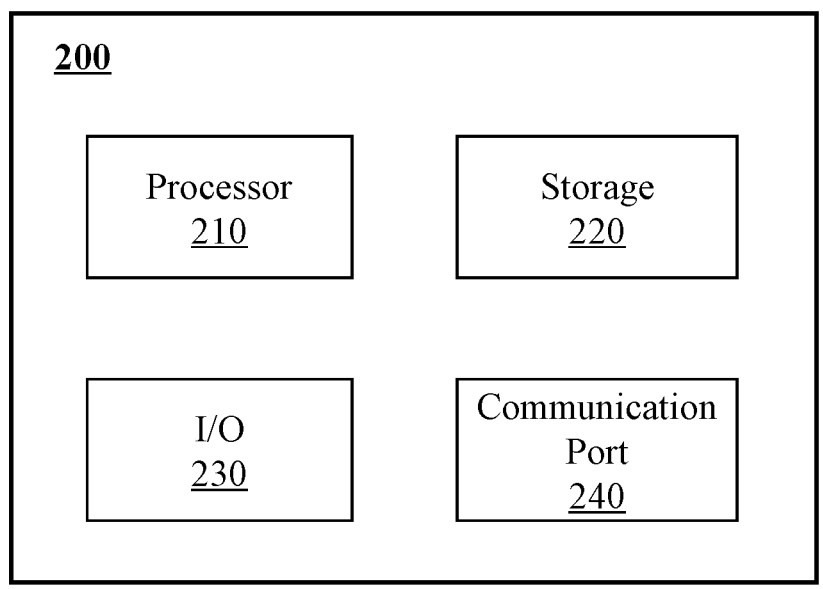
FIG. 2 is a schematic diagram illustrating hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Provided herein are systems and components for non-invasive imaging and/or treatment, such as for disease diagnosis, treatment or research purposes. In some embodiments, the system may be a radiation therapy system, a computed tomography (CT) system, an emission computed tomography (ECT) system, an X-ray photography system, a positron emission tomography (PET) system, or the like, or any combination thereof. For illustration purposes, the disclosure describes systems and methods for radiation therapy. The term "image" used in this disclosure may refer to a 2D image, a 3D image, or a 4D image. In some embodiments, the term "image" may refer to an image of a region, e.g., a region of interest (ROI), of a patient. The term "region of interest" or "ROI" used in this disclosure may refer to a part of an image along a line, in two spatial dimensions, in three spatial dimensions, or any of the proceeding as they evolve as a function of time. The image may be a CT image, PET image, an MR image, a fluoroscopy image, an ultrasound image, etc. This is not intended to limit the scope of the present disclosure. For persons having ordinary skills in the art, a certain number of variations, changes, and/or modifications may be deduced under the guidance of the present disclosure. Those variations, changes, and/or modifications do not depart from the scope of the present disclosure.

According to an aspect of the present disclosure, a method for determining a target classification of a structure in an image may be provided. The target classification may be determined from a plurality of candidate classifications using a classification model. The classification model may be trained according to a focal loss function. At least one weight of the focal loss function each of which corresponds to one of the plurality of candidate classifications being different from weights of the focal loss function corresponding to the remainder of the plurality of candidate classifications. By adjusting the weights corresponding to the plurality of candidate classifications, negative effects induced by imbalance of samples corresponding to different candidate classifications on the classification model may be reduced, and a more robust classification model may be obtained. The use of the focal loss function as the objective function may improve the performance of the classification model. The classification model may include a classification backbone network, a segmentation network, and a density network. By using the segmentation network and the density network, the density and the size of the structure may be taken into consideration in the determination of the target classification of the structure.

Figure 1:
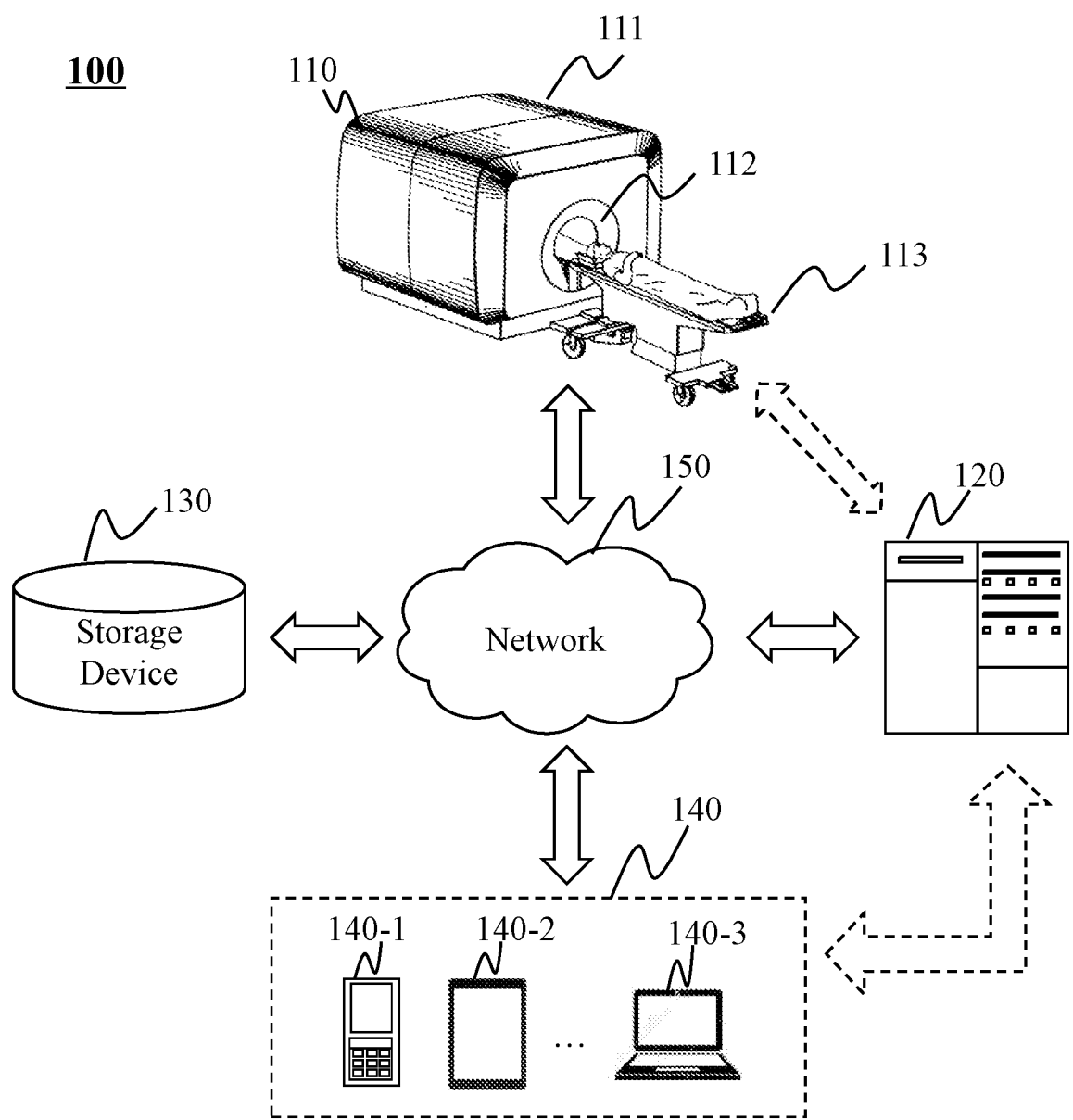
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. This is understood that the systems and methods for determining a target classification of a structure of a subject are also applicable in other systems, e.g., a treatment system. The following descriptions are provided, unless otherwise stated expressly, with reference to an imaging system for illustration purposes and not intended to be limiting. As illustrated, the imaging system 100 may include an imaging scanner 110, a processing device 120, a storage device 130, one or more terminals 140, and a network 150. The components in the imaging system 100 may be connected in various ways. Merely by way of example, as illustrated in FIG. 1, the imaging scanner 110 may be connected to the processing device 120 through the network 150. As another example, the imaging scanner 110 may be connected with the processing device 120 directly as indicated by the bi-directional arrow in dotted lines linking the imaging scanner 110 and the processing device 120. As a further example, the storage device 130 may be connected with the processing device 120 directly (not shown in FIG. 1) or through the network 150. As still a further example, one or more terminal(s) 140 may be connected with the processing device 120 directly (as indicated by the bi-directional arrow in dotted lines linking the terminal(s) 140 and the processing device 120) or through the network 150.

The imaging scanner 110 may scan a subject or a portion thereof that is located within its detection region, and generate imaging signals relating to the (part of) subject. In the present disclosure, the terms "subject" and "object" are used interchangeably. In some embodiments, the subject may include a body, a substance, or the like, or a combination thereof. In some embodiments, the subject may include a specific portion of a body, such as the head, the thorax, the abdomen, or the like, or a combination thereof. In some embodiments, the subject may include a specific organ, such as the heart, the esophagus, the trachea, the bronchus, the stomach, the gallbladder, the small intestine, the colon, the bladder, the ureter, the uterus, the fallopian tube, etc. In some embodiments, the imaging scanner 110 may include a computed tomography (CT) scanner, a positron emission computed tomography (PET) scanner, a single-photon emission computed tomography (SPECT) scanner, a magnetic resonance (MR) scanner, an ultrasonic scanner, an emission computed tomography (ECT) scanner, or the like. In some embodiment, the imaging scanner 110 may be a multi-modality device including two or more scanners listed above. For example, the imaging scanner 110 may be a PET-CT scanner, a PET-MR scanner, etc.

Merely for illustration purposes, a PET-CT scanner may be provided as an example for better understanding the imaging scanner 110, which is not intended to limit the scope of the present disclosure. The PET-CT may include a gantry 111, a detecting region 112, and a bed 113. The gantry 111 may support one or more radiation sources and/or detectors (not shown). A subject may be placed on the bed 113 for CT scan and/or PET scan. The PET-CT scanner may combine a CT scanner with a PET scanner. When the imaging scanner 110 performs a CT scan, a radiation source may emit radioactive rays to the subject, and one or more detectors may detect radiation rays emitted from the detecting region 112. The radiation rays emitted from the detecting region 112 may be used to generate CT data (also referred to as CT imaging information). The one or more detectors used in CT scan may include a scintillation detector (e.g., a cesium iodide detector), a gas detector, etc.

To prepare for a PET scan, a radionuclide (also referred to as "PET tracer" or "PET tracer molecules") may be introduced into the subject. The PET tracer may emit positrons in the detecting region 112 when it decays. An annihilation (also referred to as "annihilation event" or "coincidence event") may occur when a positron collides with an electron. The annihilation may produce two gamma photons, which may travel in opposite directions. The line connecting the detector units that detecting the two gamma photons may be defined as a "line of response (LOR)." One or more detector set on the gantry 111 may detect the annihilation events (e.g., gamma photons) emitted from the detecting region 112. The annihilation events emitted from the detecting region 112 may be used to generate PET data (also referred to as PET imaging information). In some embodiments, the one or more detectors used in the PET scan may be different from detectors used in the CT scan. In some embodiments, the one or more detectors used in the PET scan may include crystal elements and photomultiplier tubes (PMT).

The processing device 120 may process data and/or information obtained and/or retrieve from the imaging scanner 110, the terminal(s) 140, the storage device 130 and/or other storage devices. For example, the processing device 120 may obtain image data from the imaging scanner 110, and reconstruct an image of the subject based on the image data. As another example, the processing device 120 may automatically determine, by inputting the image into an identification model, a target classification of a structure of the subject in the image (e.g., a malignant pulmonary nodule or a benign pulmonary nodule). As a further example, the processing device 120 may train a classification model based on a plurality of training samples. In some embodiments, the processing device 120 may be a single server or a server group. The server group may be centralized or distributed. In some embodiments, the processing device 120 may be local or remote. For example, the processing device 120 may access information and/or data stored in the imaging scanner 110, the terminal(s) 140, and/or the storage device 130 via the network 150. As another example, the processing device 120 may be directly connected with the imaging scanner 110, the terminal(s) 140, and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented on a computing apparatus 200 having one or more components illustrated in FIG. 2 in the present disclosure.

The storage device 130 may store data and/or instructions. In some embodiments, the storage device 130 may store data obtained from the imaging scanner 110, the terminal(s) 140, and/or the processing device 120. For example, the storage device 130 may store scanning data, signals, images, videos, algorithms, texts, instructions, program codes, etc. In some embodiments, the storage device 130 may store data and/or instructions that the processing device 120 may execute or use to perform exemplary methods described in the present disclosure. In some embodiments, the storage device 130 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected with the network 150 to communicate with one or more components of the imaging system 100 (e.g., the processing device 120, the terminal(s) 140, etc.). One or more components of the imaging system 100 may access the data or instructions stored in the storage device 130 via the network 150. In some embodiments, the storage device 130 may be directly connected with or communicate with one or more components of the imaging system 100 (e.g., the processing device 120, the terminal(s) 140, etc.). In some embodiments, the storage device 130 may be part of the processing device 120.

The terminal(s) 140 may include a mobile device 140-1, a tablet computer 140-2, a laptop computer 140-3, or the like, or any combination thereof. In some embodiments, the mobile device 140-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, smart footgear, a pair of smart glasses, a smart helmet, a smartwatch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, the terminal(s) 140 may remotely operate the imaging scanner 110. In some embodiments, the terminal(s) 140 may operate the imaging scanner 110 via a wireless connection. In some embodiments, the terminal(s) 140 may receive information and/or instructions inputted by a user, and send the received information and/or instructions to the imaging scanner 110 or the processing device 120 via the network 150. In some embodiments, the terminal(s) 140 may receive data and/or information from the processing device 120. In some embodiments, the terminal(s) 140 may be part of the processing device 120. In some embodiments, the terminal(s) 140 may be omitted.

The network 150 may include any suitable network that can facilitate the exchange of information and/or data for the imaging system 100. In some embodiments, one or more components of the imaging system 100 (e.g., the imaging scanner 110, the terminal(s) 140, the processing device 120, or the storage device 130) may communicate information and/or data with one or more other components of the imaging system 100 via the network 150. In some embodiments, the network 150 may be any type of wired or wireless network, or a combination thereof. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the imaging system 100 may be connected with the network 150 to exchange data and/or information.

It should be noted that the above description of the imaging system 100 is merely provided for the purposes of illustration, not intended to limit the scope of the present disclosure. For persons having ordinary skills in the art, components contained in the imaging system 100 may be combined or adjusted in various ways, or connected with other components as sub-systems, and various variations and modifications may be conducted under the teaching of the present disclosure. However, those variations and modifications may not depart the spirit and scope of this disclosure. For example, the imaging scanner 110 may be a standalone device external to the imaging system 100, and the imaging system 100 may be connected to or in communication with the imaging scanner 110 via the network 150. All such modifications are within the protection scope of the present disclosure.

FIG. 2 is a schematic diagram illustrating hardware and/or software components of an exemplary computing apparatus 200 on which the processing device 120 may be implemented according to some embodiments of the present disclosure. As illustrated in FIG. 2, the computing apparatus 200 may include a processor 210, a storage 220, an input/output (I/O) 230, and a communication port 240.

The processor 210 may execute computer instructions (program code) and perform functions of the processing device 120 in accordance with techniques described herein. The computer instructions may include, for example, routines, programs, objects, components, signals, data structures, procedures, modules, and functions, which perform particular functions described herein. For example, the processor 210 may process data obtained from the imaging scanner 110, the terminal(s) 140, the storage device 130, and/or any other component of the imaging system 100. Specifically, the processor 210 may process image data obtained from the imaging scanner 110. For example, the processor 210 may generate an image based on the image data and identify a structure of a target classification from the image. In some embodiments, the image may be stored in the storage device 130, the storage 220, etc. In some embodiments, the image may be displayed on a display device by the I/O 230. In some embodiments, the processor 210 may perform instructions obtained from the terminal(s) 140. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing apparatus 200. However, it should be noted that the computing apparatus 200 in the present disclosure may also include multiple processors. Thus operations and/or method steps that are performed by one processor as described in the present disclosure may also be jointly or separately performed by the multiple processors. For example, if in the present disclosure the processor of the computing apparatus 200 executes both operation A and operation B, it should be understood that operation A and operation B may also be performed by two or more different processors jointly or separately in the computing apparatus 200 (e.g., a first processor executes operation A and a second processor executes operation B, or the first and second processors jointly execute operations A and B).

The storage 220 may store data/information obtained from the imaging scanner 110, the terminal(s) 140, the storage device 130, or any other component of the imaging system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 120 for determining a target classification of a structure of a subject.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the imaging scanner 110, the terminal(s) 140, or the storage device 130.

The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
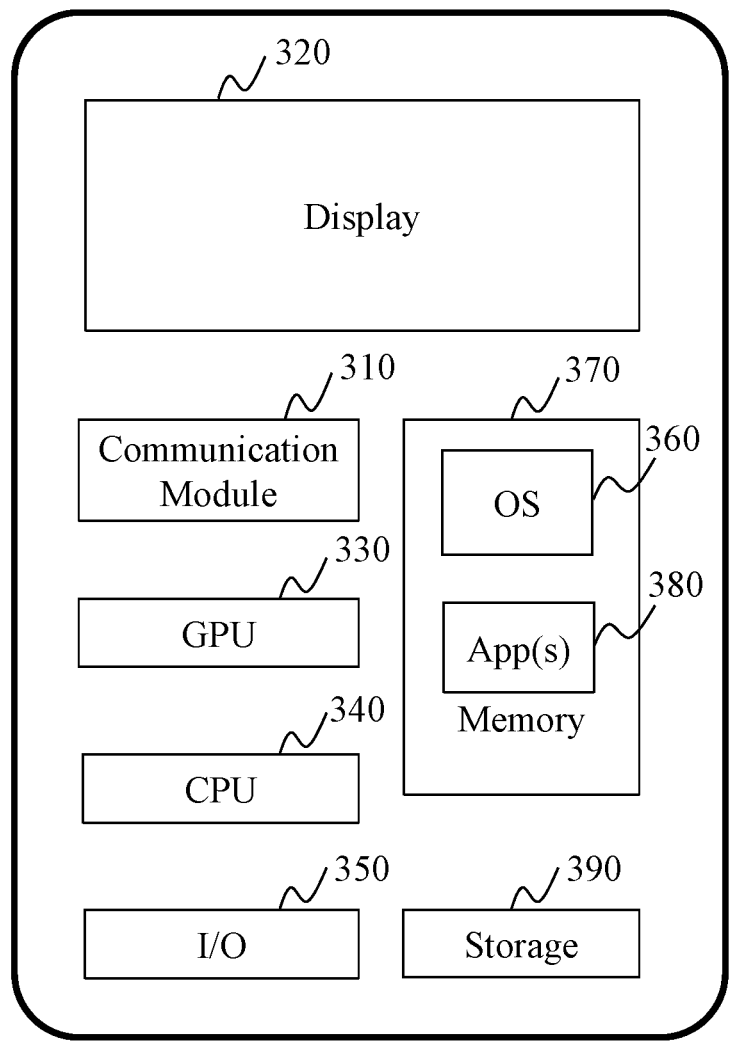
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 370, and a storage 390. In some embodiments, any other suitable component, including but not limited to a system bus or a controller (not shown), may also be included in the mobile device 300. In some embodiments, a mobile operating system 360 (e.g., iOS, Android, Windows Phone, etc.) and one or more applications 380 may be loaded into the memory 370 from the storage 390 in order to be executed by the CPU 340. The applications 380 may include a browser or any other suitable mobile apps for receiving and rendering information relating to data processing or other information from the processing device 120. User interactions with the information stream may be achieved via the I/O 350 and provided to the processing device 120 and/or other components of the imaging system 100 via the network 150.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an imaging report as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4:
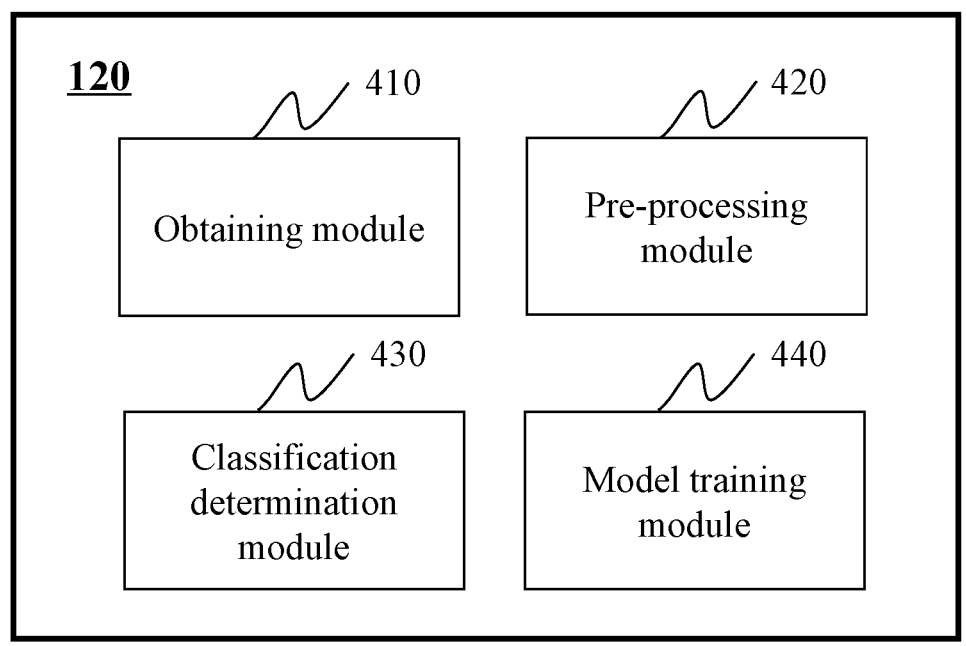
FIG. 4 is a block diagram illustrating an exemplary processing device according to some embodiments of the present disclosure.

FIG. 4 is a block diagram illustrating an exemplary processing device according to some embodiments of the present disclosure. The processing device 120 may include an obtaining module 410, a pre-processing module 420, a classification determination module 430, and a model training module 440. One or more of the modules of the processing device 120 may be interconnected. The connection(s) may be wireless or wired. At least a portion of the processing device 120 may be implemented on a computing apparatus as illustrated in FIG. 2 or a mobile device as illustrated in FIG. 3.

The obtaining module 410 may obtain data. The obtaining module 410 may obtain data from the imaging scanner 110, the processing device 120, the storage device 130, the terminal 140, or any devices or components capable of storing data via the network 150. For example, the obtaining module 410 may obtain data from a medical cloud data center (not shown) via the network 150. The obtain data may include scanning data (e.g., original image data), processed results (e.g., image data), user instructions, algorithms, models (e.g., a classification model), program codes, or the like, or a combination thereof. In some embodiments, the obtaining module 410 may obtain image data representing a structure of a subject. The obtaining module 410 may obtain the image data from a medical imaging system, such as a magnetic resonance imaging (MRI) system, a computed tomography (CT) system, a digital X-ray imaging system, an ultrasound imaging system, a positron emission computed tomography (PET) system, a PET-MR system, a PET-CT system, etc. In some embodiments, the structure of the subject may be a specific portion of a body of the subject, such as the head, the thorax, the abdomen, or the like, or a combination thereof. In some embodiments, the structure of the subject may be a specific organ of the subject, such as lungs, the heart, the esophagus, the trachea, the bronchus, the stomach, the gallbladder, the small intestine, the colon, the bladder, the ureter, the uterus, the fallopian tube, etc.

The obtaining module 410 may transmit the obtained data to a storage device (e.g., the storage device 130, etc.) for storage. In some embodiments, the obtaining module 410 may transmit the obtained data to a computing device (including, for example, pre-processing module 420, a classification determination module 430, etc.) for processing.

The pre-processing module 420 may perform pre-processing operations on data. In some embodiments, the pre-processing module 420 may perform pre-processing operations on original image data. The original image data may refer to image data acquired by the imaging scanner 110. In some embodiments, the original image data may be pre-processed to determine the image data representing the structure of the subject.

In some embodiments, pre-processing module 420 may perform pre-processing operations on the original image data using a preset image pre-processing algorithm. In some embodiments, the preset pre-processing operation may include re-sampling, according to a resampling resolution, the original image data to generate a resampled image. The resampling resolution may be preset, for example, by a user, according to default settings of the imaging system 100, etc. In some embodiments, the pre-processing operation may include segmenting the resampled image into image crops according to a center of the structure. In some embodiments, the pre-processing operation may also include normalizing the image crops using a preset normalization algorithm to obtain the image data to be input into the classification model. In some embodiments, the pre-processing operation may also include a denoising operation for removing or reducing noise or errors in the image data.

The classification determination module 430 may determine a target classification of the structure of the subject. In some embodiments, the target classification of the structure may be determined based on probabilities of a plurality of candidate classifications. The plurality of candidate classifications of the structure and their respective probabilities may be determined by inputting the image data into a classification model. The classification model may trained according to a focal loss function, at least one weight of the focal loss function each of which corresponds to one of the plurality of candidate classifications being different from weights of the focal loss function corresponding to the remainder of the plurality of candidate classifications. In some embodiments, the target classification of the pulmonary nodule may be determined by identifying a candidate classification of the structure corresponding to a largest probability among the probabilities of the plurality of candidate classifications. The identified candidate classification may be designated as the target classification of the structure.

The model training module 440 may train a model. In some embodiments, the model training module 440 may train a preliminary classification model. In some embodiments, the preliminary classification model may be any type of network model that is to be trained as the classification model. In some embodiments, the preliminary classification model may include a preliminary classification backbone network, a preliminary segmentation network, and a preliminary density network. Merely for illustration purposes, the preliminary classification backbone network may include a plurality of downsampling layers. In some embodiments, each downsampling layer may include a convolution layer, a batch normalization (BN) layer, and a rectified linear units (ReLU) layer. In some embodiments, the structure of the preliminary density network may be the same as or similar to the structure of the preliminary classification backbone network. The preliminary segmentation network may include a fully convolutional network (FCN), a SegNet (semantic segmentation network), a CRFasRNN (conditional random fields as recurrent neural network) model, a PSPNet, a ParseNet (Pyramid Scene Parsing Network), an ENet (efficient neural network), a RefineNet, or the like, or any combination thereof. In some embodiments, the preliminary classification model may further include a fully connected layer and a softmax layer.

In some embodiments, a training sample set may be generated based on historical image data. Structures may be labeled in the historical image data. Target classifications corresponding to the labeled structures in the historical image data may also be obtained. The labeled structures and the target classifications may constitute the training sample set. The model training module 440 may train the preliminary classification model using the training sample set to obtain a trained classification model.

In some embodiments, the preliminary classification model to be trained may include one or more model parameters. Exemplary model parameters may include the number (or count) of layers, the number (or count) of nodes, or the like, or any combination thereof. Before training, the preliminary classification model may have one or more initial parameter values of the model parameter(s). In the training of the preliminary model, the value(s) of the model parameter(s) of the preliminary model may be updated.

In some embodiments, the training of the preliminary classification model may include one or more iterations to iteratively update the model parameters of the preliminary model until a termination condition is satisfied in a certain iteration. Exemplary termination conditions may be that the value of an objective function (i.e., loss function) obtained in the certain iteration is less than a threshold value, that a certain count of iterations have been performed, that the objective function converges such that the difference of the values of the objective function obtained in a previous iteration and the current iteration is within a threshold value, etc. Exemplary objective functions may include a focal loss function, a log loss function, a cross-entropy loss function, a Dice loss function, etc.

In some embodiments, a focal loss function may be used as the objective function. A loss value may be determined by comparing an output of the classification model with a target classification of a structure corresponding to historical image data input into the classification model (i.e., the target classification and the historical image data may constitute a training sample pair). In some embodiments, the preliminary classification model may be trained in a plurality of iterations. During the plurality of iterations, an optimal solution of the focal loss function may be obtained.

In some embodiments, each of the plurality of candidate classifications may correspond to a weight in the focal loss function. At least one weight of the focal loss function each of which corresponds to one of the plurality of candidate classifications being different from weights of the focal loss function corresponding to the remainder of the plurality of candidate classifications. For example, a smaller weight may be assigned to a benign pulmonary nodule, and a larger weight may be assigned to a malignant pulmonary nodule. By adjusting the weights corresponding to the plurality of candidate classifications, negative effects induced by imbalance of samples corresponding to different candidate classifications on the classification model may be reduced, and a more robust classification model may be obtained. In the present disclosure, the terms "classification model" and "trained classification model" may be used interchangeably. The use of the focal loss function as the objective function may improve the performance of the classification model.

It should be noted that the above descriptions of the processing device 120 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, the processing device 120 may include one or more other modules. In some embodiments, two or more units in the processing device 120 may form one module. However, those variations and modifications also fall within the scope of the present disclosure.

Figure 5:
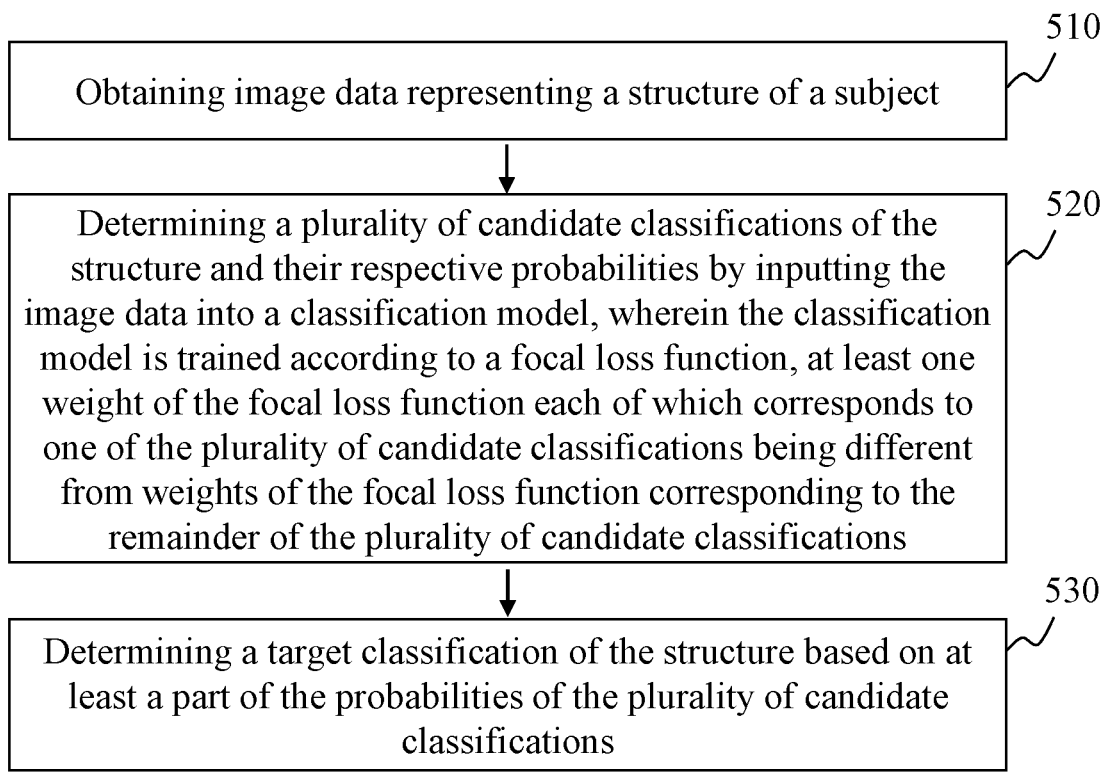
FIG. 5 includes a flowchart illustrating an exemplary process for determining a target classification of a structure of a subject in an image according to some embodiments of the present disclosure.

FIG. 5 includes a flowchart illustrating an exemplary process for determining a target classification of a structure of a subject in an image according to some embodiments of the present disclosure. In some embodiments, at least a portion of the process 500 may be performed by the processing device 120 (e.g., implemented in the computing apparatus 200 shown in FIG. 2, the processing device illustrated in FIG. 4). In some embodiments, at least a portion of the process 500 may be performed by a terminal device (e.g., the mobile device 300 shown in FIG. 3) embodying software and/or hardware.

In 510, image data representing a structure of a subject may be obtained. The image data may be obtained by the obtaining module 410.

The image data may be obtained from a medical imaging system, such as a magnetic resonance imaging (MRI) system, a computed tomography (CT) system, a digital X-ray imaging system, an ultrasound imaging system, a positron emission computed tomography (PET) system, a PET-MR system, a PET-CT system, etc. In some embodiments, an image may be reconstructed based on the image data. The image may be reconstructed using any suitable algorithm corresponding to a type of the medical imaging system. In some embodiments, the structure of the subject may be a specific portion of a body of the subject, such as the head, the thorax, the abdomen, or the like, or a combination thereof. In some embodiments, the structure of the subject may be a specific organ of the subject, such as lungs, the heart, the esophagus, the trachea, the bronchus, the stomach, the gallbladder, the small intestine, the colon, the bladder, the ureter, the uterus, the fallopian tube, etc.

In some embodiments, the image may be an image of the lungs of the subject. Pulmonary nodules on the lungs of the subject may be identified in the image. For example, features of pulmonary nodules may be extracted from images of lungs of a plurality of patients. The extracted features of the pulmonary nodules on the lungs of the plurality of patients may be stored in, for example, a feature library. The features in the feature library may be compared with features of structures on the lungs of the subject. If features of a structure on a lung of the subject matches certain features in the feature library, the structure may be identified as a pulmonary nodule.

In some embodiments, if it is needed to determined a target classification (e.g., a benign pulmonary nodule or a malignant pulmonary nodule) of a pulmonary nodule according to the image of the lungs of the subject, the pulmonary nodule in the image may be labeled, e.g., by marking a center point of the pulmonary nodule with a specific identifier. In some embodiments, the center point of the pulmonary nodule may be labeled manually by a user (e.g., a doctor, a technician, etc.). In some embodiments, the labeling of the center point of the pulmonary nodule may be automated, e.g., using a processing device (e.g., a detection device). In some embodiments, the detection device may be implemented by a detection model. The center point of the pulmonary nodule may be labeled by inputting the image of the subject into the detection model. Exemplary detection models may include a deep belief network (DBN), a stacked auto-encoders (SAE), a logistic regression (LR) model, a support vector machine (SVM) model, a decision tree model, a naive Bayesian model, a random forest model, or a restricted Boltzmann machine (RBM), a gradient boosting decision tree (GBDT) model, a LambdaMART model, an adaptive boosting model, a recurrent neural network (RNN) model, a convolutional network model, a hidden Markov model, a perceptron neural network model, a Hopfield network model, or the like, or any combination thereof. The image of the lungs of the subject with the marked pulmonary nodule may be input into a classification model to determine the target classification of the pulmonary nodule. It should be noted that the way that the center point of the pulmonary nodule is labeled is not limited in the present disclosure.

In 520, a plurality of candidate classifications of the structure and their respective probabilities may be determined by inputting the image data into a classification model, wherein the classification model is trained according to a focal loss function, at least one weight of the focal loss function each of which corresponds to one of the plurality of candidate classifications being different from weights of the focal loss function corresponding to the remainder of the plurality of candidate classifications. In some embodiments, the classification model may be trained by the model training module 440.

As used herein, the plurality of candidate classifications of the structure refers to all possible types of the structure. For example, since a pulmonary nodule may be a benign pulmonary nodule, a suspected pulmonary nodule, or a malignant pulmonary nodule, candidate classifications of a pulmonary nodule may include benign pulmonary nodule, suspected pulmonary nodule, and malignant pulmonary nodule. In some embodiments, different candidate classifications of the structure may have different features. The features of the structure may include a size, a density, a shape, etc. Taking a size of a pulmonary nodule as an example, in general, the larger the size of the pulmonary nodule is, the greater the possibility that the pulmonary nodule is a malignant pulmonary nodule will be. Most pulmonary nodules having diameters less than 5 millimeters may be benign pulmonary nodules, and most pulmonary nodules having diameters larger than 20 millimeters may be malignant pulmonary nodules. A pulmonary nodule having a diameter larger than 5 millimeters and smaller than 20 millimeters may be determined as a suspected pulmonary nodule. In addition, the candidate classifications of a structure may also relate to the density of the structure. Taking a density of a pulmonary nodule as an example, the pulmonary nodule may be sorted, according to the density of the pulmonary nodule, as a ground-glass nodule, a calcified nodule, a solid nodule, or a mixed nodule. Calcified nodules may substantially be benign pulmonary nodules, and ground-glass nodules may substantially be malignant pulmonary nodules.

Merely for illustration purposes, a classification model may be provided in combination with a pulmonary nodule. The classification model may include a classification backbone network, a segmentation network, and a density network. The classification backbone network may determine a backbone feature of the structure (e.g., features corresponding to a plurality of candidate classifications of the structure). The segmentation network may determine a segmentation feature (e.g., size) of the structure. The density network may determine a density feature (e.g., density) of the structure. In some embodiments, the classification model may further include a fully connected layer and a softmax layer. Details of the classification model may be described elsewhere in the present disclosure, see, e.g., FIGS. 6 and 7 and the descriptions thereof.

In some embodiments, the image data obtained in 510 may be input into the classification backbone network, the segmentation network, and the density network, respectively. The output of each of the classification backbone network, the segmentation network, and the density network may be obtained. In some embodiments, the output of the classification backbone network, the segmentation network, and the density network may be or include a probability corresponding to each of the plurality of candidate classifications. The target classification of the structure may be determined based on the output of the classification backbone network, the segmentation network, and the density network.

In some embodiments, each of the plurality of candidate classifications may correspond to a weight in the focal loss function. At least one weight of the focal loss function each of which corresponds to one of the plurality of candidate classifications being different from weights of the focal loss function corresponding to the remainder of the plurality of candidate classifications. For example, a smaller weight may be assigned to a benign pulmonary nodule, and a larger weight may be assigned to a malignant pulmonary nodule. By adjusting the weights corresponding to the plurality of candidate classifications, negative effects induced by imbalance of samples corresponding to different candidate classifications on the classification model may be reduced, and a more robust classification model may be obtained. The use of the focal loss function as the objective function may improve the performance of the classification model.

In 530, a target classification of the structure may be determined based on at least a part of the probabilities of the plurality of candidate classifications. In some embodiments, the target classification of the structure may be determined by the classification determination module 430.

In some embodiments, the output of the classification model may include a plurality of candidate classification of the structure and a probability corresponding to each of the plurality of candidate classifications. Since the classification model includes a classification backbone network, a segmentation network, and a density network, three sets of candidate classifications of the structure and three sets of corresponding probabilities may be determined by inputting the image data into the classification model. The target classification of the structure may be determined based on at least two of the three sets of probabilities from the three sets of candidate classifications. For example, the target classification of the structure may be determined based on probabilities from the candidate classifications corresponding to the classification backbone network and the segmentation network. As another example, the target classification of the structure may be determined based on probabilities from the candidate classifications corresponding to the classification backbone network and the density network. Since three networks including the classification backbone network, the segmentation network, and the density network are used in the classification model, the accuracy of the determation of the target classification of the structure may be improved, and the need for human intervention on the determination of the target classification of the structure may be reduced.

Merely by ways of example, for a pulmonary nodule on a lung of a subject, there may be three candidate classifications of the pulmonary nodule, e.g., benign pulmonary nodule, suspected pulmonary nodule, and malignant pulmonary nodule. The probability corresponding to each of the three candidate classifications may represent a probality that the pulmonary nodule is a benignancy, a probality that the pulmonary nodule is a suspected malignancy, and a probality that the pulmonary nodule is a malignancy, respectively. In some embodiments, the target classification of the pulmonary nodule may be determined by identifying a candidate classification of the structure corresponding to a largest probability among the probabilities of the plurality of candidate classifications. The identified candidate classification may be designated as the target classification of the structure. For example, if the probability corresponding to a candidate classification of a benignancy is 0.73, the probability corresponding to a candidate classification of a suspected malignancy is 0.35, and the probability corresponding to a candidate classification of a malignancy is 0.27, it may be determined that the pulmonary nodule in the image may be benign.

The operations for determining a target classification of a structure of a subject in an image provided in the process 500 may include obtaining the image data representing the structure of the subject, inputting the image data into the classification model including the classification backbone network, the segmentation network, and the density network, so as to obtain the plurality of candidate classifications of the structure and their respective probabilities, and determine the target classification of the structure based on the probabilities of the plurality of candidate classifications. The target classification of the pulmonary nodule may be determined by combining the classification backbone network, the segmentation network and the density network, thereby improving the accuracy of the diagnosis of the pulmonary nodule.

In some embodiments, original image data may be obtained. The original image data may refer to image data acquired by the imaging scanner 110. In some embodiments, the original image data may be pre-processed to determine the image data representing the structure of the subject.

In some embodiments, original image data obtained by different medical imaging systems and/or using different imaging parameters may vary in terms of resolution, distribution range of grey values, etc. In order to obtain image data satisfying requirements of the classification backbone network, the segmentation network, and/or the density network, pre-processing operations may be performed on the original image data to obtain the image data. The pre-processing operations may be performed by the pre-processing module 420.

In some embodiments, the original image data may be pre-processed using a preset image pre-processing algorithm. In some embodiments, the pre-processing operation may include re-sampling, according to a resampling resolution, the original image data to generate a resampled image. The resampling resolution may be preset, for example, by a user, according to default settings of the imaging system 100, etc. In some embodiments, the pre-processing operation may include segmenting the resampled image into image crops according to a center of the structure. In some embodiments, the pre-processing operation may also include normalizing the image crops using a preset normalization algorithm to obtain the image data to be input into the classification model. In some embodiments, the pre-processing operation may also include a denoising operation for removing or reducing noise or errors in the image data.

Merely for illustration purposes, the original image data may represent a lung of a subject. Center points of pulmonary nodules on the lung may be labeled in the image data. The image data may be resampled, segmened, and/or normalized, to obtain pre-processed image data. For example, the image data may be resampled to have a specified resolution. As another example, the resampled image data may be segmented into image crops with preset sizes (e.g., 64*64*64) according to a center of a pulmonary nodule (i.e., a center of an image crop coincides with the center of the pulmonary nodule). As a further example, the segmented image data may be normalized into a specified grayscale distribution range (e.g., 0-1). In some embodiments, the image may further be denoised using a denoising algorithm.

Figure 6:
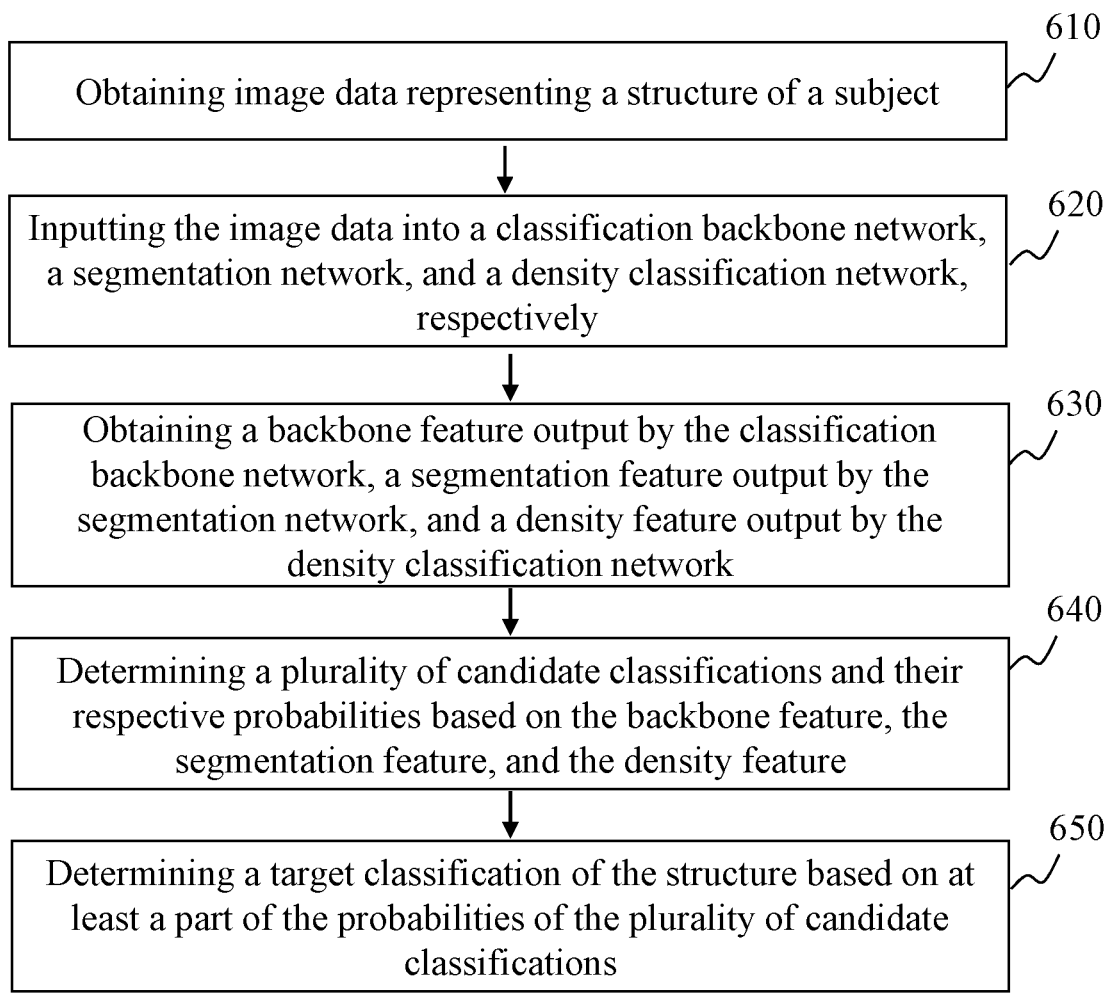
FIG. 6 includes a flowchart illustrating an exemplary process for determining a target classification of a structure of a subject in an image according to some embodiments of the present disclosure.

FIG. 6 includes a flowchart illustrating an exemplary process for determining a target classification of a structure of a subject in an image according to some embodiments of the present disclosure. In some embodiments, at least a portion of the process 600 may be performed by the processing device 120 (e.g., implemented in the computing apparatus 200 shown in FIG. 2, the processing device illustrated in FIG. 4). In some embodiments, at least a portion of the process 600 may be performed by a terminal device (e.g., the mobile device 300 shown in FIG. 3) embodying software and/or hardware.

In 610, image data representing a structure of a subject may be obtained. In some embodiments, the image data may be obtained by the obtaining module 410. In some embodiments, the operation 610 may be the same as or similar to the operation 510 in the process 500 as illustrated in FIG. 5.

In 620, the image data may be input into a classification backbone network, a segmentation network, and a density network, respectively.

In some embodiments, the classification backbone network, the segmentation network, and the density network may be components of a classification model. In some embodiments, the classification model may be described in combination with the classification of a pulmonary nodule. The image data obtained in 610 may be input into the classification backbone network, the segmentation network, and the density network, respectively.

The classification backbone network may determine a backbone feature of the structure (e.g., features corresponding to a plurality of candidate classifications of the structure). Merely for illustration purposes, the classification backbone network may include a plurality of (e.g., 2, 4, 8, 10, etc.) downsampling layers. In some embodiments, each downsampling layer may include a convolution layer, a batch normalization (BN) layer, and a rectified linear units (ReLU) layer. The BN layer may be configured to receive and normalize an output of the convolutional layer (e.g., feature maps). It should be noted that the implementation of each downsampling layer may not be limited in the present disclosure. In some embodiments, each downsampling layer may include one or more DenseNet blocks and/or ResNet blocks. For example, each downsampling layer may be implemented using a ResNet block. The ResNet block may facilitate a better convergency for deep networks.

The density network may determine a density feature (e.g., density) of the structure. In some embodiments, the structure of the density network may be the same as or similar to the structure of the classification backbone network. For example, the density network may also include a plurality of downsampling layers.

The segmentation network may determine a segmentation feature (e.g., size) of the structure. The segmentation network may include a fully convolutional network (FCN), a SegNet (semantic segmentation network), a CRFasRNN (conditional random fields as recurrent neural network) model, a PSPNet, a ParseNet (Pyramid Scene Parsing Network), an ENet (efficient neural network), a RefineNet, or the like, or any combination thereof.

In 630, a backbone feature output by the classification backbone network, a segmentation feature output by the segmentation network, and a density feature output by the density network may be obtained.

In some embodiments, after the image data is input into the classification backbone network, the segmentation network, and the density network, the backbone feature, the segmentation feature, and the density feature may be output from the classification backbone network, the segmentation network, and the density network, respectively. In some embodiments, the backbone feature, the segmentation feature, and the density feature may be expressed in forms of feature maps.

In 640, a plurality of candidate classifications and their respective probabilities may be determined based on the backbone feature, the segmentation feature, and the density feature.

In some embodiments, the plurality of candidate classifications and their respective probabilities may be generated by combining the backbone feature output by the classification backbone network, the segmentation feature output by the segmentation network, and the density feature output by the density network. In some embodiments, the backbone feature, the segmentation feature, and the density feature may be expressed in forms of feature maps. The feature maps may be combined to obtain a new feature map. The new feature map may be input into a fully connected layer and a softmax layer to determine the plurality of candidate classifications and their respective probabilities. The fully connected layer may connect to the classification backbone network, the segmentation network, and the density network. The softmax layer may be subsequent to the fully connected layer. In some embodiments, the output of the softmax layer may be expressed in the form of a probability map. The probability map may include the plurality of candidate classifications and the probabilities corresponding to each candidate classification.

In some embodiments, the backbone feature, the segmentation feature, and the density feature may be combined to obtain an classification feature of the image data. The plurality of candidate classifications and the probabilities corresponding to each candidate classification may be determined based on the classification feature. In some embodiments, the backbone feature, the segmentation feature, and the density feature output by the classification backbone network, the segmentation network, and the density network, respectively, may be expressed in the form of three-dimensional feature maps. In some embodiments, before the classification feature is determined, the three-dimensional feature map of the backbone feature, the three-dimensional feature map of the segmentation feature, and the three-dimensional feature map of the density feature may be converted into a one-dimensional backbone feature vector, a one-dimensional segmentation feature vector, and a one-dimensional density feature vector, respectively. The combination of the backbone feature, the segmentation feature, and the density feature may be implemented based on the one-dimensional backbone feature vector, the one-dimensional segmentation feature vector, and the one-dimensional density feature vector.

For example, the combination of the backbone feature, the segmentation feature, and the density feature may be realized by converting the backbone feature, the segmentation feature, and the density feature into a one-dimensional backbone feature vector, a one-dimensional segmentation feature vector, and a one-dimensional density feature vector, respectively, and splicing the one-dimensional backbone feature vector, the one-dimensional segmentation feature vector, and the one-dimensional density feature vector to obtain a one-dimensional classification feature vector. The one-dimensional classification feature vector may be used to determine the plurality of candidate classifications and the probabilities corresponding to each candidate classification.

In some embodiments, the order in which the one-dimensional backbone feature vector, the one-dimensional segmentation feature vector, and the one-dimensional density feature vector are spliced may not be limited in the present disclosure. Merely by ways of example, if the one-dimensional backbone feature vector is [0, 1, 1, 5, 6, 8], the one-dimensional segmentation feature vector is [2, 3, 4], the one-dimensional segmentation feature vector is [7, 9, 5], the one-dimensional classification feature vector obtained by splicing the one-dimensional backbone feature vector, the one-dimensional segmentation feature vector, and the one-dimensional density feature vector may be [0, 1, 1, 5, 6, 8, 2, 3, 4, 7, 9, 5].

In 650, a target classification of the structure may be determined based on at least a part of the probabilities of the plurality of candidate classifications. In some embodiments, the target classification of the structure may be determined by the classification determination module 430. In some embodiments, the operation 650 may be the same as or similar to the operation 530 in the process 500 as illustrated in FIG. 5.

Figure 7:
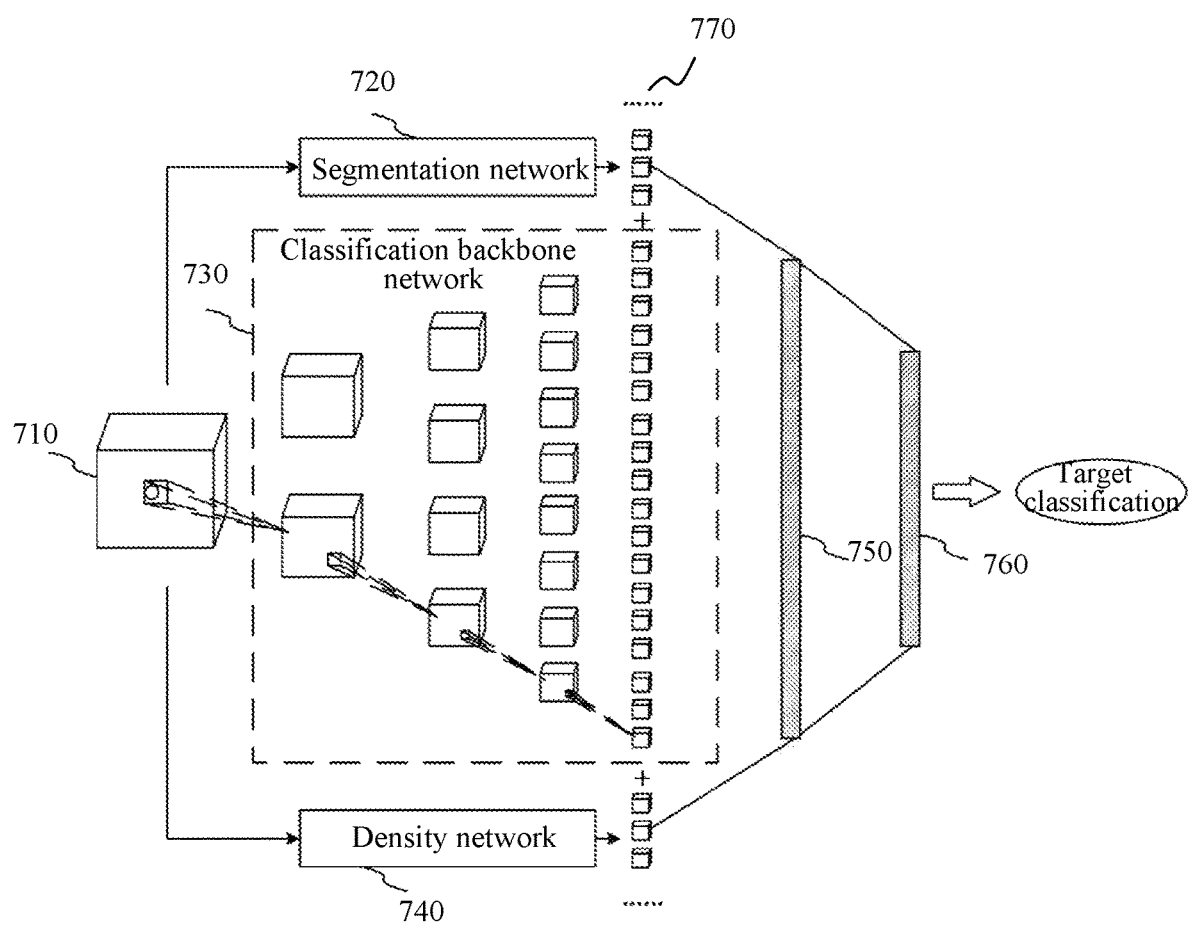
FIG. 7 is a schematic diagram of a classification model for determining a target classification for a pulmonary nodule according to some embodiments of the present disclosure.

FIG. 7 is a schematic diagram of a classification model for determining a target classification for a pulmonary nodule according to some embodiments of the present disclosure. The classification may include a segmentation network 720, a classification backbone network 730, a density network 740, a fully connected layer 750, and a softmax layer 760. As shown in FIG. 7, an image block 710 (e.g., including one or more images, each of which represents the pulmonary nodule(s) on a lung of a subject) may be obtained. The image block 710 may be input into the segmentation network 720, the classification backbone network 730, and the density network 740, respectively. The output of the segmentation network 720, the classification backbone network 730, and the density network 740 may be feature maps. The feature maps may be combined to determine a classification feature 770 of the image block 710. The classification feature 770 of the image block may be into the fully connected layer 750 and the softmax layer 760. The output of the softmax layer 760 may be a probability map. The probability map may include a plurality of candidate classifications of the pulmonary nodule (e.g., benign pulmonary nodule, suspected pulmonary nodule, and malignant pulmonary nodule) and probabilities corresponding to each candidate classification.

Technical solutions disclosed in the above embodiments of the present disclosure may provide the working process of the classification model including, for example, inputting image data representing a structure of a subject into a classification backbone network, a segmentation network, and a density network, respectively, obtaining a backbone feature output by the classification backbone network, a segmentation feature output by the segmentation network, and a density feature output by the density network, and determining a target classification of the structure according to the backbone feature, the segmentation feature, and the density feature. In this way, a structure of a certain type (e.g., malignant pulmonary nodule) may be identified combining the size, the density, and other features of the structure, and the accuracy of a medical diagnosis may be improved.

Figure 8:
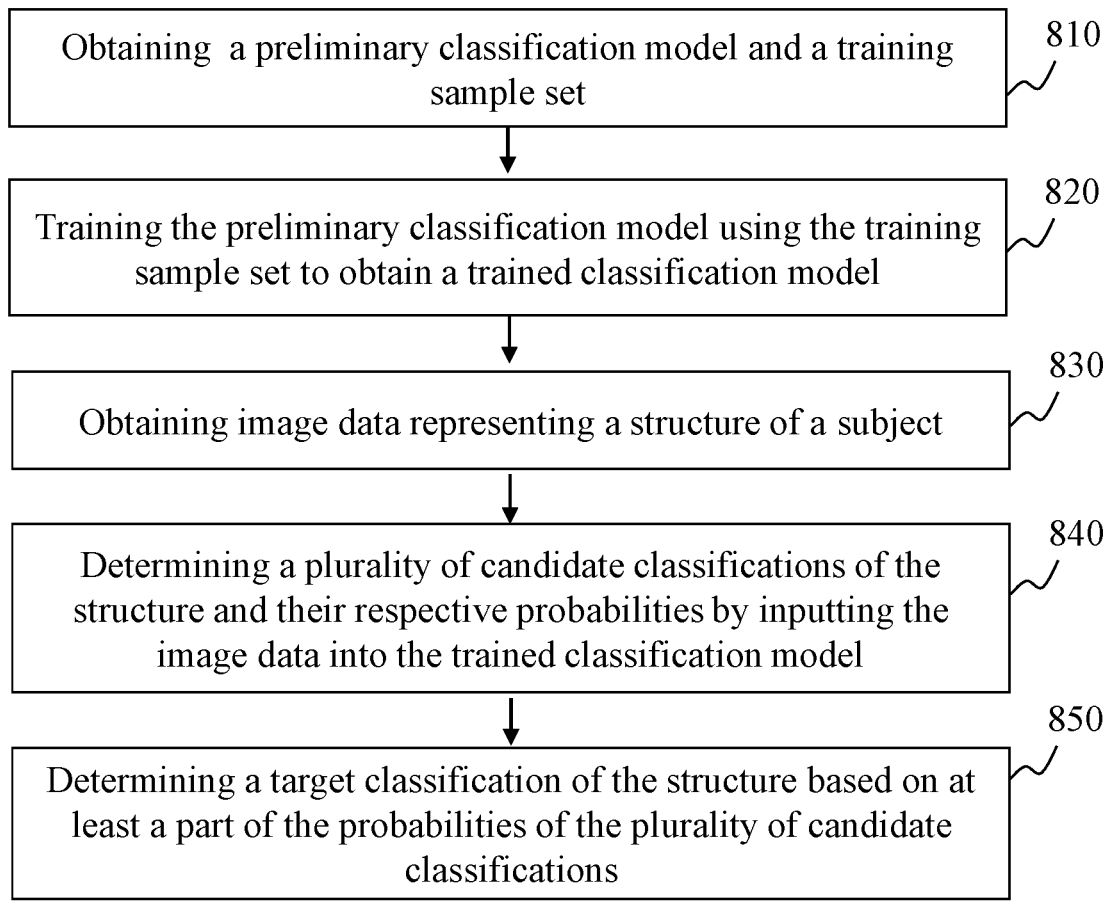
FIG. 8 includes a flowchart illustrating an exemplary process for determining a target classification of a structure of a subject in an image according to some embodiments of the present disclosure.

FIG. 8 includes a flowchart illustrating an exemplary process for determining a target classification of a structure of a subject in an image according to some embodiments of the present disclosure. In some embodiments, at least a portion of the process 800 may be performed by the processing device 120 (e.g., implemented in the computing apparatus 200 shown in FIG. 2, the processing device illustrated in FIG. 4). In some embodiments, at least a portion of the process 800 may be performed by a terminal device (e.g., the mobile device 300 shown in FIG. 3) embodying software and/or hardware.

In 810, a preliminary classification model and a training sample set may be obtained.

In some embodiments, the preliminary classification model may be any type of network model that is to be trained as the classification model. In some embodiments, the preliminary classification model may include a preliminary classification backbone network, a preliminary segmentation network, and a preliminary density network. Merely for illustration purposes, the preliminary classification backbone network may include a plurality of downsampling layers. In some embodiments, each downsampling layer may include a convolution layer, a batch normalization (BN) layer, and a rectified linear units (ReLU) layer. In some embodiments, each downsampling layer may include one or more DenseNet blocks and/or ResNet blocks. For example, each downsampling layer may be implemented by a ResNet block. The ResNet block may facilitate a better convergency for deep networks. In some embodiments, the structure of the preliminary density network may be the same as or similar to the structure of the preliminary classification backbone network. For example, the preliminary density network may also include a plurality of (e.g., four) downsampling layers. The preliminary segmentation network may include a fully convolutional network (FCN), a SegNet (semantic segmentation network), a CRFasRNN (conditional random fields as recurrent neural network) model, a PSPNet, a ParseNet (Pyramid Scene Parsing Network), an ENet (efficient neural network), a RefineNet, or the like, or any combination thereof. In some embodiments, the preliminary classification model may further include a fully connected layer and a softmax layer.

In some embodiments, the training sample set may be generated based on the historical image data, the structures labeled in the image data, and the target classifications corresponding to the structures in the historical image data. In some embodiments, the training sample set may be previously generated and stored in a storage device (e.g., the storage device 130, the storage 220, the storage 390, or an external source). For example, the training sample set may include historical image data representing structures of a plurality of subject generated using the imaging device 110, whereins center points of the structures may be labeled in the historical image data and target classifications corresponding to the structures in the historical image data may be determined, by a doctor manually and/or by a computing device automatically. The training sample set may be stored in the storage device of the imaging system 100 and retrieved by the processing device 120 from the storage device. Alternatively, the training sample set may be generated by the processing device 120. For example, the processing device 120 may pre-process historical image data representing structures of a plurality of subject with center points of the structures labeled. Merely by way of example, the historical image data may be resample to generate resampled image data having a target image resolution. Optionally, the processing device 120B may further normalize the resampled image data. As another example, the processing device 120 may extract one or more image crops from the resampled image data, and normalize each of the image crop(s).

In 820, the preliminary classification model may be trained using the training sample set to obtain a trained classification model.

In some embodiments, the preliminary classification model to be trained may include one or more model parameters. Exemplary model parameters may include the number (or count) of layers, the number (or count) of nodes, or the like, or any combination thereof. Before training, the preliminary classification model may have one or more initial parameter values of the model parameter(s). In the training of the preliminary model, the value(s) of the model parameter(s) of the preliminary model may be updated.

In some embodiments, the training of the preliminary classification model may include one or more iterations to iteratively update the model parameters of the preliminary model until a termination condition is satisfied in a certain iteration. Exemplary termination conditions may be that the value of an objective function (i.e., loss function) obtained in the certain iteration is less than a threshold value, that a certain count of iterations have been performed, that the objective function converges such that the difference of the values of the objective function obtained in a previous iteration and the current iteration is within a threshold value, etc. Exemplary objective functions may include a focal loss function, a log loss function, a cross-entropy loss function, a Dice loss function, etc.

In some embodiments, a focal loss function may be used as the objective function. A loss value may be determined by comparing an output of the classification model with a target classification of a structure corresponding to historical image data input into the classification model (i.e., the target classification and the historical image data may constitute a training sample pair). In some embodiments, the preliminary classification model may be trained in a plurality of iterations. During the plurality of iterations, an optimal solution of the focal loss function may be obtained.

In some embodiments, each of the plurality of candidate classifications may correspond to a weight in the focal loss function. At least one weight of the focal loss function each of which corresponds to one of the plurality of candidate classifications being different from weights of the focal loss function corresponding to the remainder of the plurality of candidate classifications. For example, a smaller weight may be assigned to a benign pulmonary nodule, and a larger weight may be assigned to a malignant pulmonary nodule. By adjusting the weights corresponding to the plurality of candidate classifications, negative effects induced by imbalance of samples corresponding to different candidate classifications on the classification model may be reduced, and a more robust classification model may be obtained. In the present disclosure, the terms "classification model" and "trained classification model" may be used interchangeably. The use of the focal loss function as the objective function may improve the performance of the classification model.

Merely for illustration purposes, the historical image data may be input into the preliminary classification model in a particular batch size (e.g., a batch size of 10, 24, 48, 100, etc.) to train the preliminary classification model. In some embodiments, in the training process of the preliminary classification model, all the historical image data in the particular batch size may be input into the preliminary classification model to train the preliminary classification model.

In some embodiments, the historical image data may be input into the preliminary classification backbone network, the preliminary segmentation network, and the preliminary density network simultaneously. In some embodiments, the historical image data may be input into the preliminary classification backbone network, the preliminary segmentation network, and the preliminary density network individually or in sequence. For example, the preliminary segmentation network and the preliminary density network may be trained in advance, and the historical image data may be input into the preliminary classification backbone network to train the preliminary classification model. In some embodiments, the preliminary classification model may be trained in a plurality of iterations. The trained classification model may be saved as a file in a storage device (e.g., the storage device 130).

In some embodiments, before the generation of the training sample set based on the historical image data, the structures, and the target classifications corresponding to the structures in the historical image data, a pre-processing operation (e.g., resampling, normalization, denoising, etc.) may be performed on the historical image data.

In 830, image data representing a structure of a subject may be obtained. The image data may be obtained by the obtaining module 410.

In 840, a plurality of candidate classifications of the structure and their respective probabilities may be determined by inputting the image data into the trained classification model.

In 850, a target classification of the structure may be determined based on at least a part of the probabilities of the plurality of candidate classifications. In some embodiments, the operations 830 through 850 may be the same as or similarly to the operations 510 through 530 of the process 500 as illustrated in FIG. 5.

Figure 9:
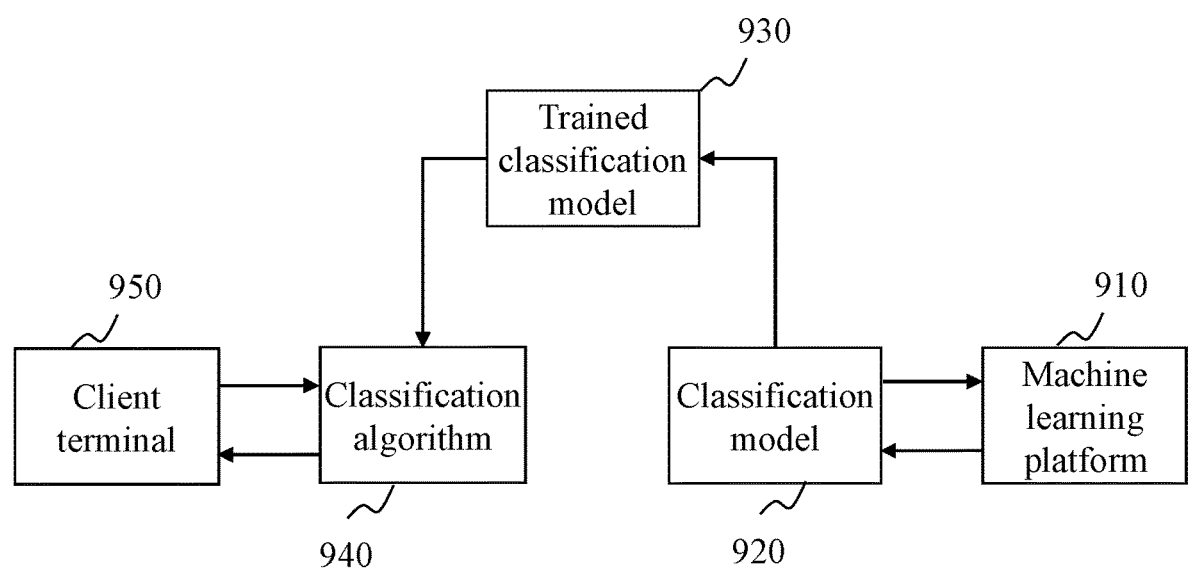
FIG. 9 includes a schematic diagram illustrating the determination of a target classification of a structure of a subject in an image according to some embodiments of the present disclosure.

FIG. 9 includes a schematic diagram illustrating the determination of a target classification of a structure of a subject in an image according to some embodiments of the present disclosure. As shown in FIG. 9, the determination of the target classification of the structure may include two phases including a model training phase and a classification phases. A classification model (e.g., a neural network model) for classification may be generated during the model training phase. The classification model may include a plurality of parameters. The plurality of parameters may be determined through a training process. The parameters may be loaded in the classification model to determine a target classification of a structure in an image input by a user. In some embodiments, a machine learning platform 910 may train a classification model 920 using a training sample set. The training sample set may include historical image data representing structures of a plurality of subject generated using the imaging device 110, whereins the structures may be labeled in the historical image data and target classifications corresponding to the structures in the historical image data may be determined, by a doctor manually and/or by a computing device automatically. In some embodiments, the structures may be labeled by marking center points of the structures in the training sample set. The process for training the classification model may enable the model to learn a general rule that maps inputs to corresponding outputs. Exemplary algorithms that the machine learning platform may use to train the model may include a gradient boosting decision tree (GBDT) algorithm, a decision tree algorithm, a Random Forest algorithm, a logistic regression algorithm, a support vector machine (SVM) algorithm, a Naive Bayesian algorithm, an AdaBoost algorithm, a K-a nearest neighbor (KNN) algorithm, a Markov Chains algorithm, or the like, or any combination thereof.

In some embodiments, the classification model may be trained in a plurality of iterations. In some embodiments, the training process may terminate when the focal loss function reaches a preset threshold, and a trained classification model 930 may be obtained. The trained classification model 930 may be saved as a file in a storage device of the imaging system 100. In some embodiments, the trained classification model 930 may be incorporated into a classification algorithm 940 to facilitate the target classification determination of the structure. A client terminal 950 may receive image data representing a structure to be classified, and determine a target classification of the structure to be classified using the classification algorithm 940. The target classification of the structure may be feed back to the client terminal 950, which may be used for medical diagnosis of the structure (e.g., in a form of a diagnostic report).

Technical solutions disclosed in the above embodiments of present disclosure may provide an operation of training the classification model using the historical image data and the target classifications corresponding to the historical image data. The training sample set may be generated based on the historical image data and the target classifications corresponding to the historical image data. The classification model may be trained using the training sample set and a focal loss function. In some embodiments, each of the plurality of candidate classifications may correspond to a weight in the focal loss function. By adjusting the weights corresponding to the plurality of candidate classifications, negative effects induced by imbalance of samples corresponding to different candidate classifications on the classification model may be reduced, and a more robust classification model may be obtained. The use of the focal loss function as the objective function may improve the performance of the classification model.

Figure 10:
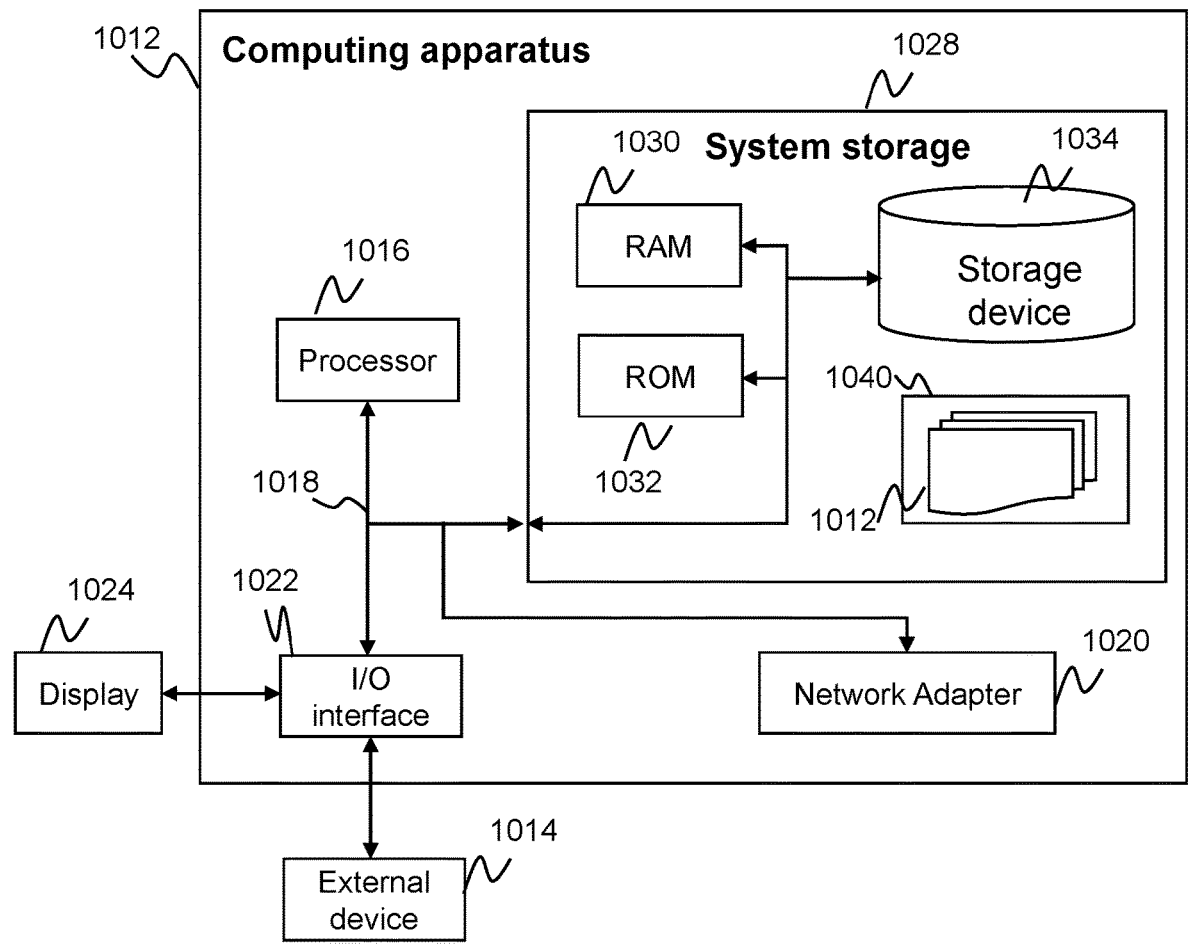
FIG. 10 is a schematic diagram of an exemplary computing apparatus according to some embodiments of the present disclosure.

FIG. 10 is a schematic diagram of an exemplary computing apparatus according to some embodiments of the present disclosure. The computing apparatus 1012 may facilitate the implementation of the processes or operations provided in the present disclosure. The computing apparatus 1012 illustrated in FIG. 10 is merely an example, but not intended to limit the scope of the present disclosure.

As shown in FIG. 10, the computing apparatus 1012 may be implemented by a computing device of general purposes. The computing apparatus 1012 may include but are not limited to one or more processors 1016, a system memory 1028, and a bus 1018 that connects elements or components of the computing apparatus 1012, such as the system memory 1028, the one or more processors 1016, etc.

The bus 1018 may represent one or more of several types of bus structures, including a memory bus, a memory controller, peripheral bus, an accelerated graphics port, the one or more processors 1016, or a local bus using any of a variety of bus structures. For example, the bus structures may include but not limited to, an Industry Standard Architecture (ISA) bus, a Micro Channel Architecture (MAC) bus, an Enhanced ISA Bus, a Video Electronics Standards Association (VESA) local bus, a peripheral component interconnects (PCI) bus, etc.

The computing apparatus 1012 may include a variety of computer readable media. The computer readable media may be any available media including volatile or non-volatile media, removable or non-removable media, etc., that may be accessible by the computing apparatus 1012.

The system memory 1028 may include computer readable media in a form of volatile memory, for example, a random access memory (RAM) 1030 and/or a read-only memory (ROM) 1032. The computing apparatus 1012 may further include other removable/non-removable or volatile/non-volatile computer system storage media. Merely by ways of example, a storage device 1034 may be non-removable, non-volatile magnetic media (not shown in the figure, commonly referred to as a "hard disk drive") for reading and writing. Although not shown in FIG. 10, a disk drive for reading and writing to a removable non-volatile disk (such as a "floppy disk") and a removable non-volatile disk (such as a CD-ROM, a DVD-ROM, or other optical media) may be provided. In these cases, each drive may be coupled to the bus 1018 via one or more data medium ports. The system memory 1028 may include at least one program product having a set (e.g., at least one) of program modules configured to implement the functions provided in the above embodiments of the present disclosure.

A program/utility tool 1040 having a set (at least one) of program modules 1042, which may be stored, for example, in the memory 1028. The program modules 1042 may include but not limited to, an operating system, one or more applications, other program modules, or program data. Each or a combination of one or more of the above listed program modules may have a network environment implementation. The program module 1042 may perform the functions and/or methods provided in the described embodiments of the present disclosure.

The computing apparatus 1012 may also be in communication with one or more external devices 1014 (e.g., a keyboard, a pointing device, a display 1024, etc.), one or more devices that enable a user to interact with the computing apparatus 1012, and/or any devices (e.g., a network card, a modem, etc.) that enable the computing apparatus 1012 to communicate with one or more other computing devices. The communication may be realized via an input/output (I/O) interface 1022. Also, the computing apparatus 1012 may also communicate with one or more networks (e.g., a local area network (LAN), a wide area network (WAN), and/or a public network, such as the Internet) through a network adapter 1020. As shown in the figure, the network adapter 1020 may communicate with other modules of computing apparatus 1012 via the bus 1018. It should be understood that, other hardware and/or software modules may be utilized in combination with the computing apparatus 1012, including but not limited to microcode, device drivers, redundant processing units, external disk drive arrays, RAID systems, Tape drives, or data backup storage systems.

The one or more processors 1016 may implement, by running a program stored in the system memory 1028, various functional applications and/or data processing, for example, a method of classification determination of a structure of a subject in an image provided in some embodiments of the present disclosure. According to an aspect of the present disclosure, the method may include obtaining image data representing a structure of a subject. The method may also include determining a plurality of candidate classifications of the structure and their respective probabilities by inputting the image data into a classification model, wherein the classification model is trained according to a focal loss function, at least one weight of the focal loss function each of which corresponds to one of the plurality of candidate classifications being different from weights of the focal loss function corresponding to the remainder of the plurality of candidate classifications. The method may further include determining a target classification of the structure based on the probabilities of the plurality of candidate classifications.

Those skilled in the art may understand that the one or more processors 1016 may also implement technical solutions of the exposure process control method provided by any embodiments of the present disclosure.

The present disclosure may further provide a computer readable storage medium storing computer programs. When the computer programs are executed by a processor, operations of classification determination of a structure of a subject in an image provided in the present disclosure may be implemented. According to a first aspect of the present disclosure, the operations may include obtaining image data representing a structure of a subject. The operations may also include determining a plurality of candidate classifications of the structure and their respective probabilities by inputting the image data into a classification model, wherein the classification model is trained according to a focal loss function, at least one weight of the focal loss function each of which corresponds to one of the plurality of candidate classifications being different from weights of the focal loss function corresponding to the remainder of the plurality of candidate classifications. The operations may further include determining a target classification of the structure based on the probabilities of the plurality of candidate classifications.

It should be noted that the computer programs stored in the computer readable storage medium may not limited to the methods or operations provided above, other methods or operations related to the automated positioning of the subject may also be provided.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or features may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
   at least one storage medium including a set of instructions; and
   at least one processor configured to communicate with the at least one storage medium, wherein when executing the set of instructions, the system is directed to perform operations including:
   obtaining image data representing a structure of a subject;
   obtaining a backbone feature, a segmentation feature, and a density feature of the structure by inputting the image data into a classification model, wherein the classification model includes a backbone network for determining the backbone feature of the structure, a segmentation network for determining the segmentation feature of the structure, and a density classification network for determining the density feature of the structure;
   converting the backbone feature, the segmentation feature, and the density feature into a one-dimensional backbone feature vector, a one-dimensional segmentation feature vector, and a one-dimensional density feature vector, respectively;
   determining a one-dimensional identification feature vector by splicing the one-dimensional backbone feature vector, the one-dimensional segmentation feature vector, and the one-dimensional density feature vector; and
   determining a plurality of candidate classifications of the structure and their respective probabilities based on the one-dimensional identification feature vector; and
   determining a target classification of the structure based on at least a part of the probabilities of the plurality of candidate classifications.

2. The system of claim 1, wherein the backbone network includes a plurality of down-sampling layers, each down-sampling layer including a convolution layer, a batch normalization layer, and a rectified linear unit layer.

3. The system of claim 1, wherein the classification model is trained according to a focal loss function, at least one weight of the focal loss function each of which corresponds to one of the plurality of candidate classifications being different from weights of the focal loss function corresponding to the remainder of the plurality of candidate classifications.

4. The system of claim 1, the obtaining image data representing a structure of a subject including:
   obtaining original image data including a representation of the structure of the subject; and
   determining the image data by preprocessing the original image data.

5. The system of claim 4, the determining the image data by preprocessing the original image data including:
   generating a resampled image by resampling the original image data according to a resampling resolution;
   segmenting the resampled image into image crops according to a center of the structure; and
   determining the image data by normalizing the image crops according to a normalizing function.

6. A method implemented on a computing device having a processor and a computer-readable storage device, the method comprising:
   obtaining, by the computing device, image data representing a structure of a subject;
   obtaining, by the computing device, a backbone feature, a segmentation feature, and a density feature of the structure by inputting the image data into a classification model, wherein the classification model includes a backbone network for determining the backbone feature of the structure, a segmentation network for determining the segmentation feature of the structure, and a density classification network for determining the density feature of the structure;
   converting, by the computing device, the backbone feature, the segmentation feature, and the density feature into a one-dimensional backbone feature vector, a one-dimensional segmentation feature vector, and a one-dimensional density feature vector, respectively;
   determining, by the computing device, a one-dimensional identification feature vector by splicing the one-dimensional backbone feature vector, the one-dimensional segmentation feature vector, and the one-dimensional density feature vector; and
   determining, by the computing device, a plurality of candidate classifications of the structure and their respective probabilities based on the one-dimensional identification feature vector; and
   determining, by the computing device, a target classification of the structure based on at least a part of the probabilities of the plurality of candidate classifications.

7. The method of claim 6, wherein the backbone network includes a plurality of down-sampling layers, each down-sampling layer including a convolution layer, a batch normalization layer, and a rectified linear unit layer.

8. The method of claim 6, wherein the classification model is trained according to a focal loss function, at least one weight of the focal loss function each of which corresponds to one of the plurality of candidate classifications being different from weights of the focal loss function corresponding to the remainder of the plurality of candidate classifications.

9. The method of claim 6, the obtaining image data representing a structure of a subject including:
   obtaining original image data including a representation of the structure of the subject; and
   determining the image data by preprocessing the original image data.

10. The method of claim 9, the determining the image data by preprocessing the original image data including:
    generating a resampled image by resampling the original image data according to a resampling resolution;
    segmenting the resampled image into image crops according to a center of the structure; and
    determining the image data by normalizing the image crops according to a normalizing function.

11. A non-transitory computer readable medium, comprising at least one set of instructions, wherein when executed by at least one processor of a computing device, the at least one set of instructions causes the computing device to perform a method, the method comprising:
    obtaining image data representing a structure of a subject;
    obtaining a backbone feature, a segmentation feature, and a density feature of the structure by inputting the image data into a classification model, wherein the classification model includes a backbone network for determining the backbone feature of the structure, a segmentation network for determining the segmentation feature of the structure, and a density classification network for determining the density feature of the structure;

converting the backbone feature, the segmentation feature, and the density feature into a one-dimensional backbone feature vector, a one-dimensional segmentation feature vector, and a one-dimensional density feature vector, respectively;

determining a one-dimensional identification feature vector by splicing the one-dimensional backbone feature vector, the one-dimensional segmentation feature vector, and the one-dimensional density feature vector; and determining a plurality of candidate classifications of the structure and their respective probabilities based on the one-dimensional identification feature vector; and determining a target classification of the structure based on at least a part of the probabilities of the plurality of candidate classifications.

12. The non-transitory computer readable medium of claim 11, wherein the backbone network includes a plurality of down-sampling layers, each down-sampling layer including a convolution layer, a batch normalization layer, and a rectified linear unit layer.

13. The non-transitory computer readable medium of claim 11, wherein the classification model is trained according to a focal loss function, at least one weight of the focal loss function each of which corresponds to one of the plurality of candidate classifications being different from weights of the focal loss function corresponding to the remainder of the plurality of candidate classifications.

14. The non-transitory computer readable medium of claim 11, the obtaining image data representing a structure of a subject including:

obtaining original image data including a representation of the structure of the subject; and determining the image data by preprocessing the original image data.

15. The non-transitory computer readable medium of claim 14, the determining the image data by preprocessing the original image data including:

generating a resampled image by resampling the original image data according to a resampling resolution;

segmenting the resampled image into image crops according to a center of the structure; and determining the image data by normalizing the image crops according to a normalizing function.

* * * * *